Figure 1:
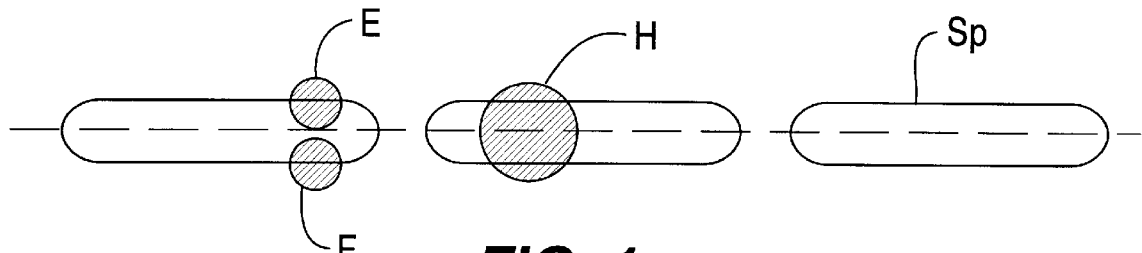

United States Patent

Kühn et al.

[11] Patent Number: 5,841,745
[45] Date of Patent: Nov. 24, 1998

[54] METHOD AND APPARATUS FOR ELIMINATING DISTURBANCES ENCOUNTERED DURING SCANNING OF AN INFORMATION CARRIER

[75] Inventors: Hans-Robert Kühn, St. Georgen; Hartmut Richter, Villingen-Schwenningen, both of Germany

[73] Assignee: Deutsche Thomson-Brandt GmbH, Villingen-Schwennigen, Germany

[21] Appl. No.: 481,456

[22] PCT Filed: Jan. 19, 1994

[86] PCT No.: PCT/EP94/00124

§ 371 Date: Dec. 2, 1996

§ 102(e) Date: Dec. 2, 1996

[87] PCT Pub. No.: WO94/17525

PCT Pub. Date: Aug. 4, 1994

[30] Foreign Application Priority Data

Jan. 23, 1993 [DE] Germany .................. 43 01 827.0

[51] Int. Cl.[6] .................................................. G11B 7/00
[52] U.S. Cl. ................. 369/44.23; 369/112; 369/119; 369/44.37
[58] Field of Search ................. 369/44.37, 110, 369/109, 103, 112, 44.23, 44.24, 44.12, 119

[56] References Cited

U.S. PATENT DOCUMENTS

| 4,160,269 | 7/1979 | Kramer et al. | 369/110 |
| 5,434,834 | 7/1995 | Shinoda et al. | 369/44.23 |
| 5,694,385 | 12/1997 | Takahashi et al. | 369/110 |

FOREIGN PATENT DOCUMENTS 60-121548  6/1985  Japan ............................. 369/44.37

*Primary Examiner*—Nabil Hindi
*Attorney, Agent, or Firm*—Joseph S. Tripoli; Frederick A. Wein

[57] ABSTRACT

A process and arrangement for tracking and eliminating disturbances which occur in particular while scanning optical information carriers. The invention avoids the inconvenience of disturbance elimination using time-delayed auxiliary beam signals by influencing the auxiliary beams of a scanner working according to a three-beam principle in such a way that they hit the information carrier to be scanned as two auxiliary beams which lie next to each other on the track radius, so that disturbances due to subtraction between the auxiliary light spot signals formed by the auxiliary light spots are eliminated. A birefringent crystal is preferably used in order to direct the auxiliary beams in this manner. The invention is preferably suitable for optical information carrier scanning devices.

7 Claims, 6 Drawing Sheets

METHOD AND APPARATUS FOR ELIMINATING DISTURBANCES ENCOUNTERED DURING SCANNING OF AN INFORMATION CARRIER

The invention relates to a process and arrangements for the tracking and for the elimination of scanning disturbances of optical information carriers such as, for example, CD, magneto-optical, phase change or write once disks.

The so-called multi-beam or three-beam principle is known for the scanning and especially for the guidance of a scanning beam on an optical information carrier, cf. KRIEG, Bernhard: Praxis der digitalen Audiotechnik in Franzis Arbeitsbuch [Digital Sound Engineering Practise in Franzis Workbook], Franzis Verlag GmbH, 1989, pp. 45 et seq. An auxiliary light spot for tracking is provided in each instance ahead of and behind a main light spot for information reproduction or information recording, in the tangential direction. The auxiliary light spots are aligned in each instance to the extent of one half on the track, in the radial direction (cf. attached FIG. 2) and serve to generate a radial error signal. To this end, the light reflected by the information carrier is in each instance detected separately by a photo detecter [sic]. A tracking error signal is then obtained by difference formation from the intensities of the reflected light beams of the two auxiliary light spots or auxiliary beams respectively; in this case, the first auxiliary signal is time-delayed by an amount which is obtained from the spacing of the auxiliary light spots and the scanning speed, cf. player DA-100 from the Hitachi company. It is disadvantageous that detected disturbance signals which are caused by faults of the information carrier such as, for example, scratches, dropouts, black dots or even by the information content of the synchronization signals cannot be entirely eliminated by difference formation, since in the case of a time delay the signals are falsified in dependence upon the signal character with respect to the steepness of their signal flanks. Furthermore, in the event of differing scanning speeds or alterations of the spacing of the auxiliary light spots from the main-eight spot, a constant signal delay leads to a lesser extinction of disturbance signals, so that in the radial servo circuit forces are generated which may lead to a disturbance of the scanning or to loss of the track.

Figure 2:
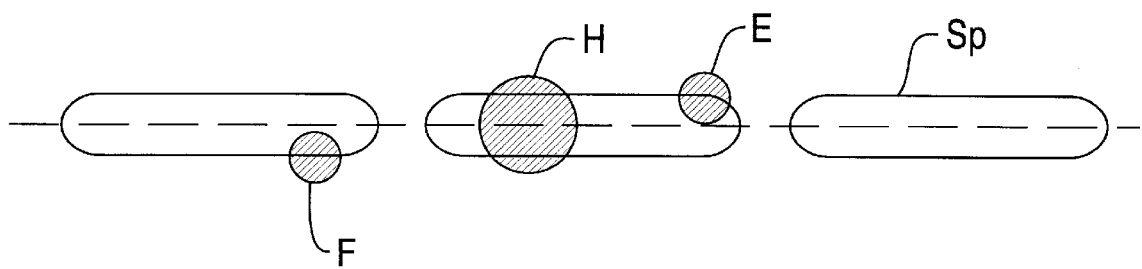

The auxiliary light spots and the main light spot on the optical disk are generated using a laser beam by splitting by means of a grating into 0-order and +/− first-order beams and focusing by means of an objective lens. In this case, the 0-arrangement [sic] beam forms the main light spot and the +/− first order beams the auxiliary light spots. With typical dimensioning, the directions of propagation of the light beams or respectively laser beams differ by less than one degree and the focal points are generated, by an objective lens, approximately in the information plane of the information carrier. An adequate spatial separation of the light spots on the optical disk in accordance with the arrangement in FIG. 2 is necessary, in order to be able to detect the auxiliary light spots individually and to use them for tracking. In in [sic] the figures, the auxiliary light spots E, F have been shown in differing size, for reasons of better distinction from the main light spot H, although the light spots are, as a rule, of equal size.

The object of the invention is to avoid the disadvantages of the tracking and of the elimination of disturbances by time-delaying of an auxiliary light spot signal and subsequent difference formation, with low expenditure.

This object is achieved by the invention specified in claims 1 and 4. Advantageous further developments are specified in the subclaims.

The invention is based on the principle that in the case of a scanning device operating in accordance with the multi-beam principle, scanning beams are provided in such a manner that the auxiliary beams for tracking impinge on the information carrier to be scanned in the form of two auxiliary beams lying side by side on the track radius. In this case, these auxiliary beams can be provided jointly, impinging on the information carrier either ahead of or behind the main light spot, and serve not only for the known tracking, but also at the same time for the advantageous elimination of scanning disturbances. A time-delaying of an auxiliary light spot signal, which time delaying leads to disadvantageous signal alterations, is no longer necessary. This is achieved in that the signals detected by means of the auxiliary beams originate from auxiliary light spots which are disposed radially side by side and a difference formation can thereby be undertaken directly, so that disturbances are directly extinguished or eliminated. To form the track error signal, the auxiliary beam signals are directly subjected to a difference formation, whereby the disadvantages of the known multibeam process are avoided. To carry out the process, a beam deflection means is provided in the beam path of a scanning device operating in accordance with the multibeam principle, which beam deflection device comprises for example a divided tangential mirror or a beam-deflecting grating; in this case, such arrangements do however require relatively large spacings between radiation source and information carrier to be scanned as well as special measures for the separation of the auxiliary beams to be detected and a high mechanical complexity.

Accordingly, preference is given to an arrangement which has in the beam path a birefringent crystal such as, for example, a Wollaston prism. By means of the birefringent crystal, three scanning beams which are generated by a laser using a grating, are doubled with respect to their number. The beams generated by means of the Wollaston prism exhibit differing directions of polarization, so that auxiliary and respectively secondary beams polarized perpendicular to one another can be provided along the track at an arbitrarily small spacing from one another on different sides of the track. The auxiliary beams are aligned preferably side by side on the track radius and exhibit a differing polarization, which is advantageous for the separation of the items of scanning information. As a result of the auxiliary beams aligned by means of the beam deflection means side by side on the track radius, differing scanning speeds no longer have a disadvantageous effect on the masking out or elimination of scanning disturbances and the tracking is improved with respect to error locations and eccentricity of the information carrier.

The invention is explained in greater detail in the text which follows, with reference to drawings.

Figure 7:
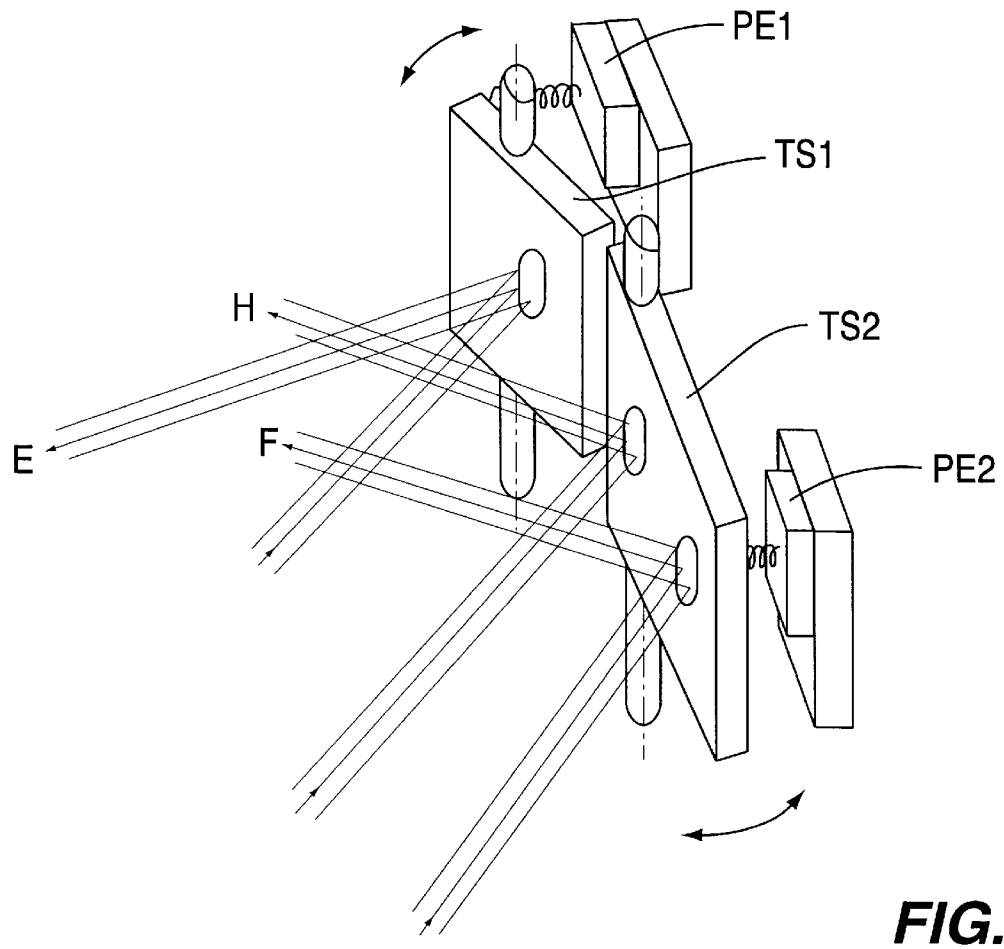
Figure 3:
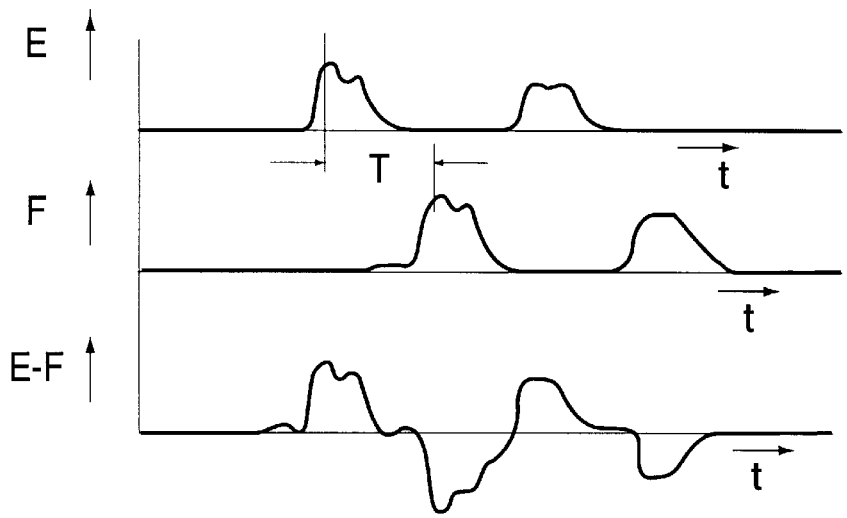
Figure 4:
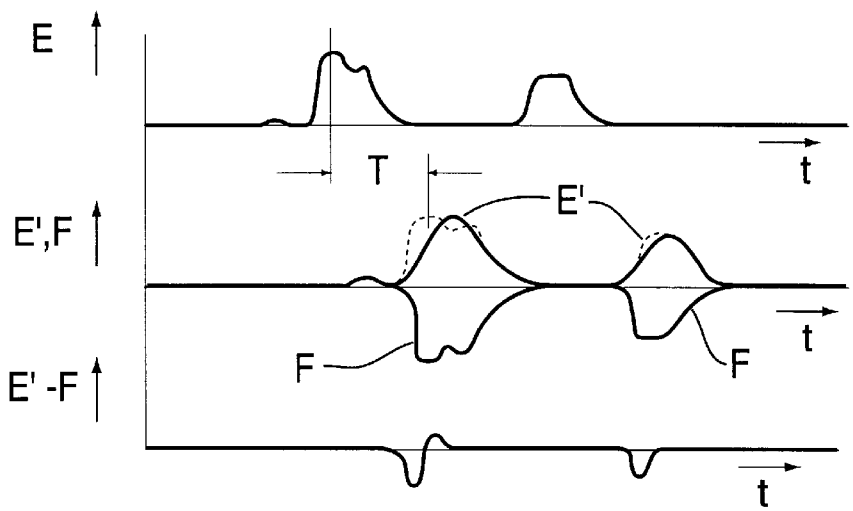
Figure 5:
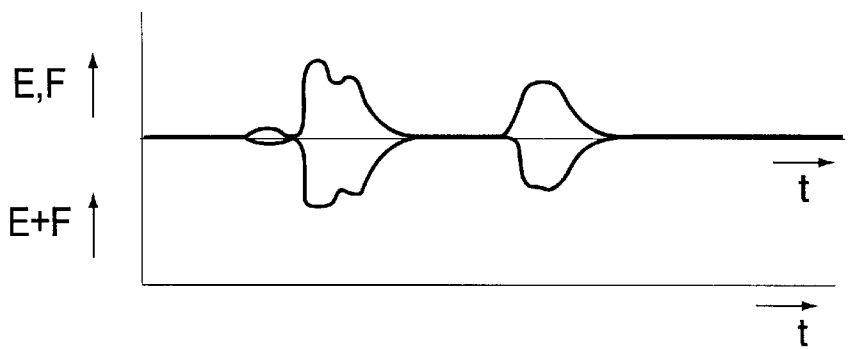
Figure 6:
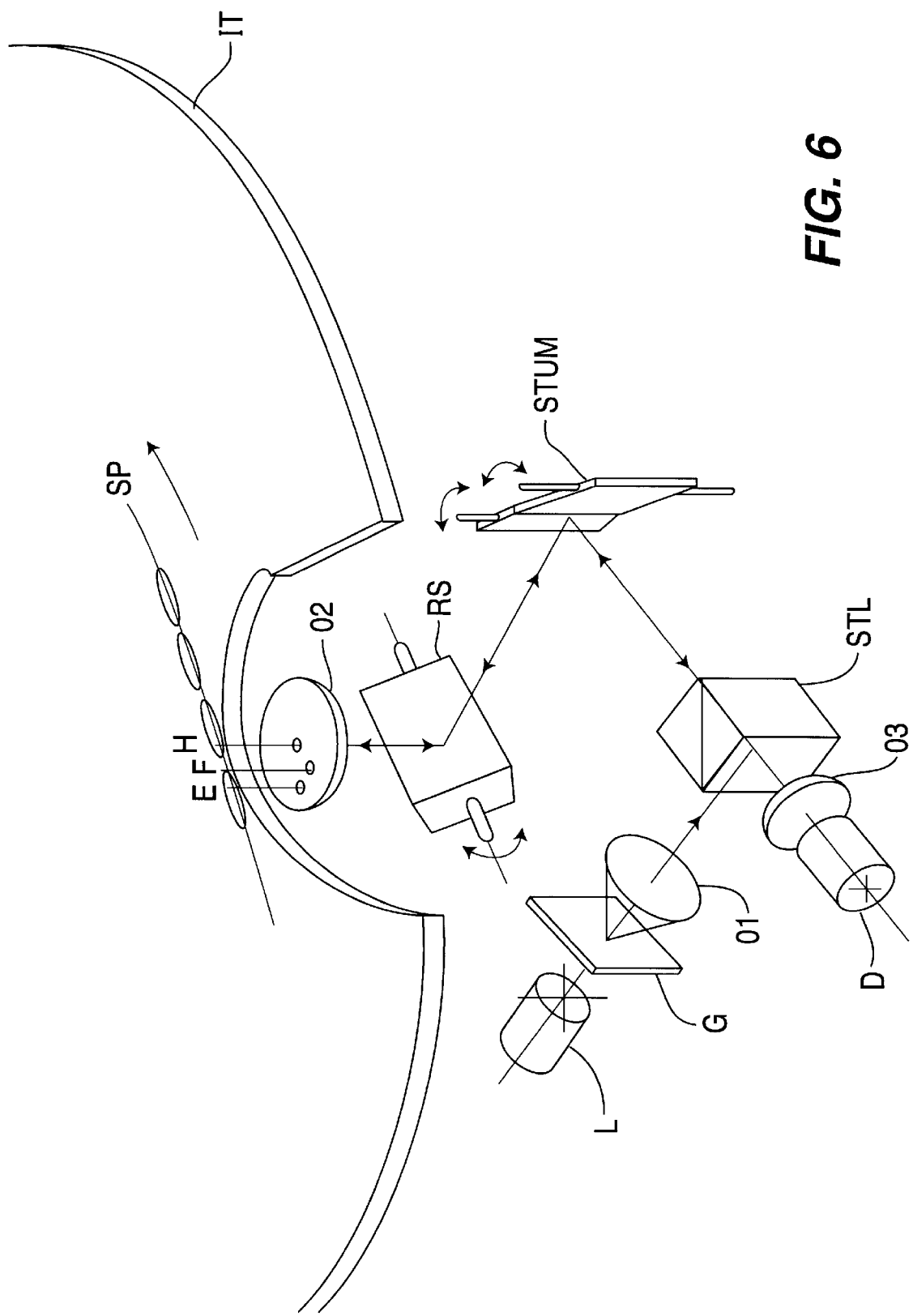
Figure 8:
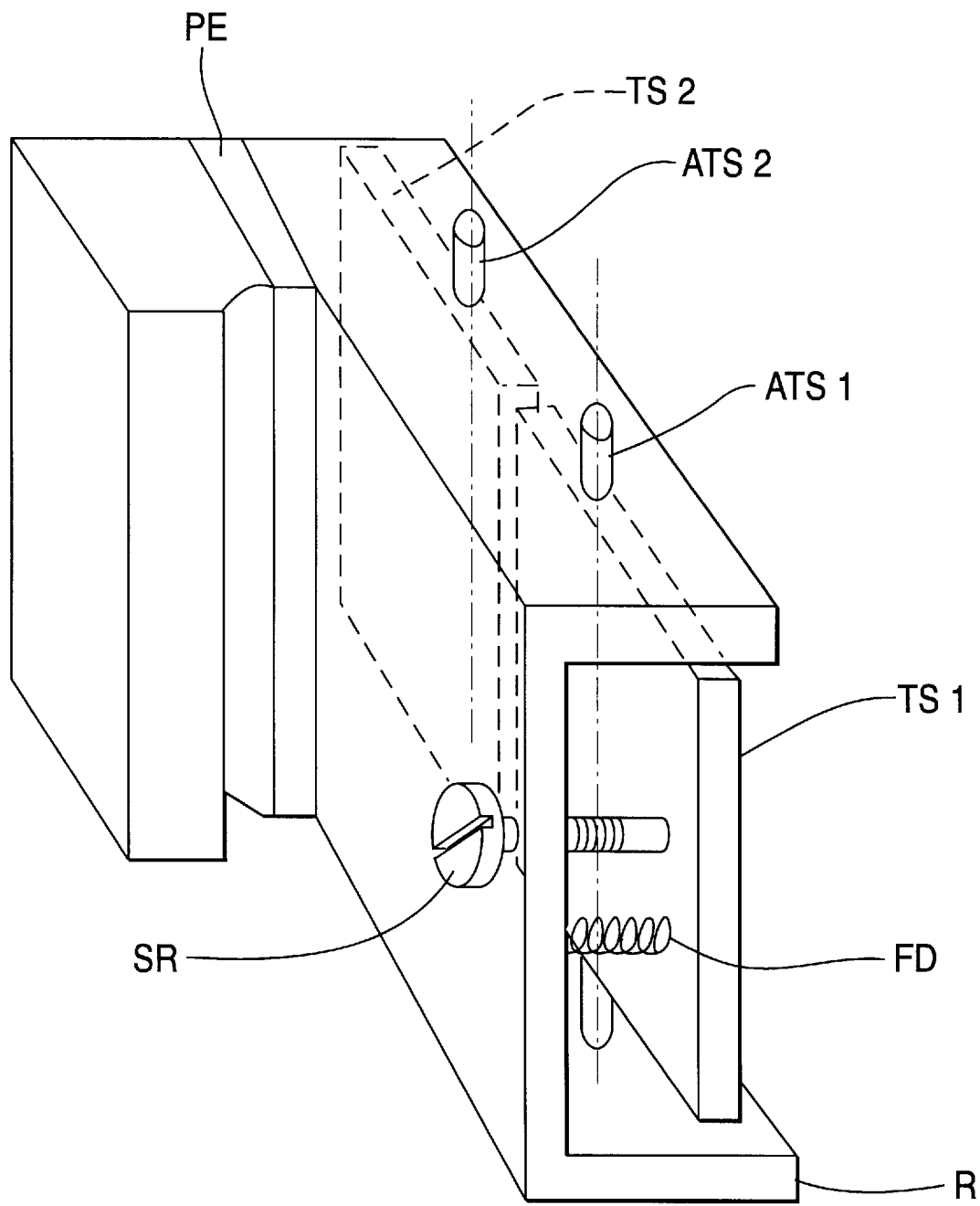
Figure 9:
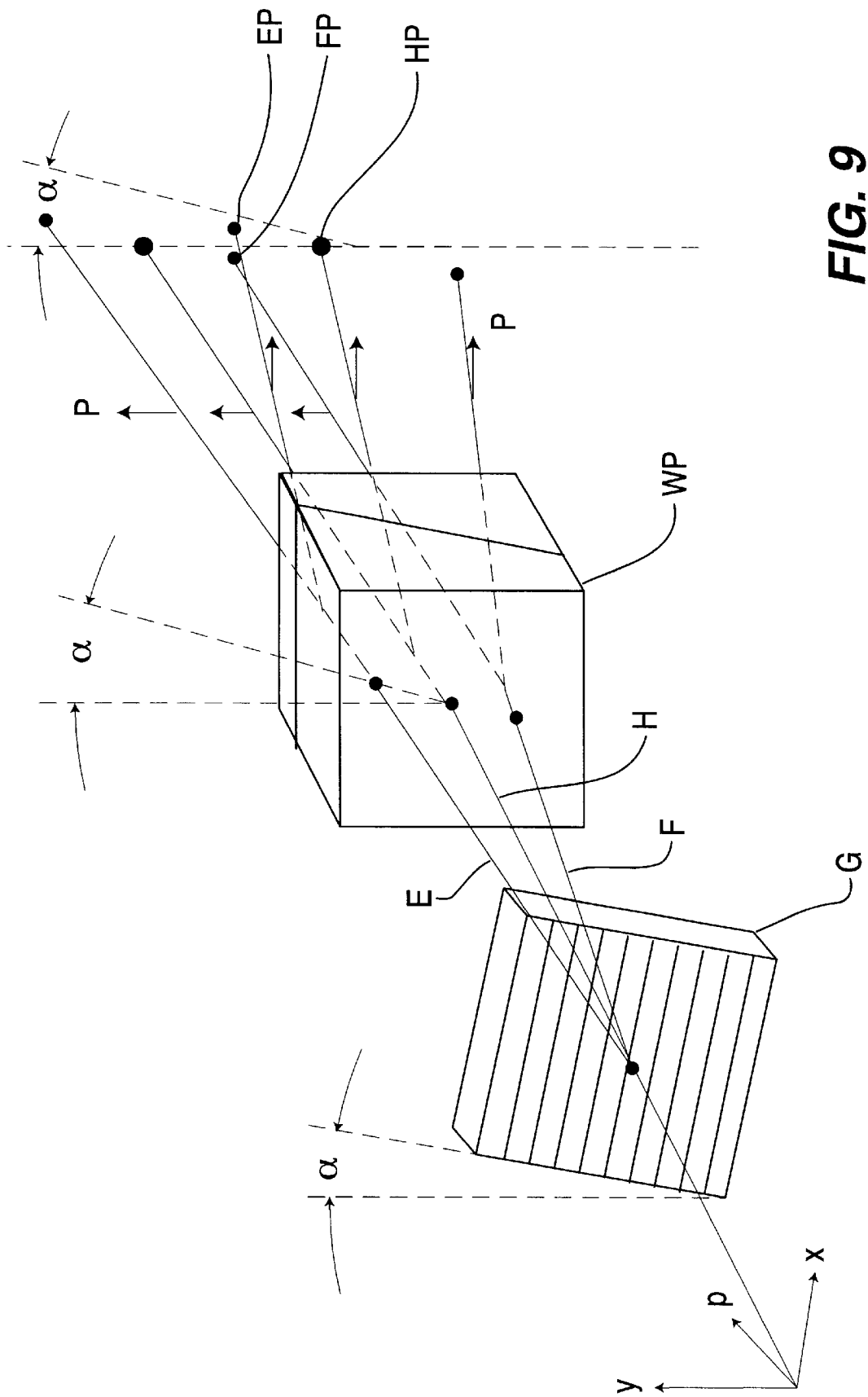
Figure 10:
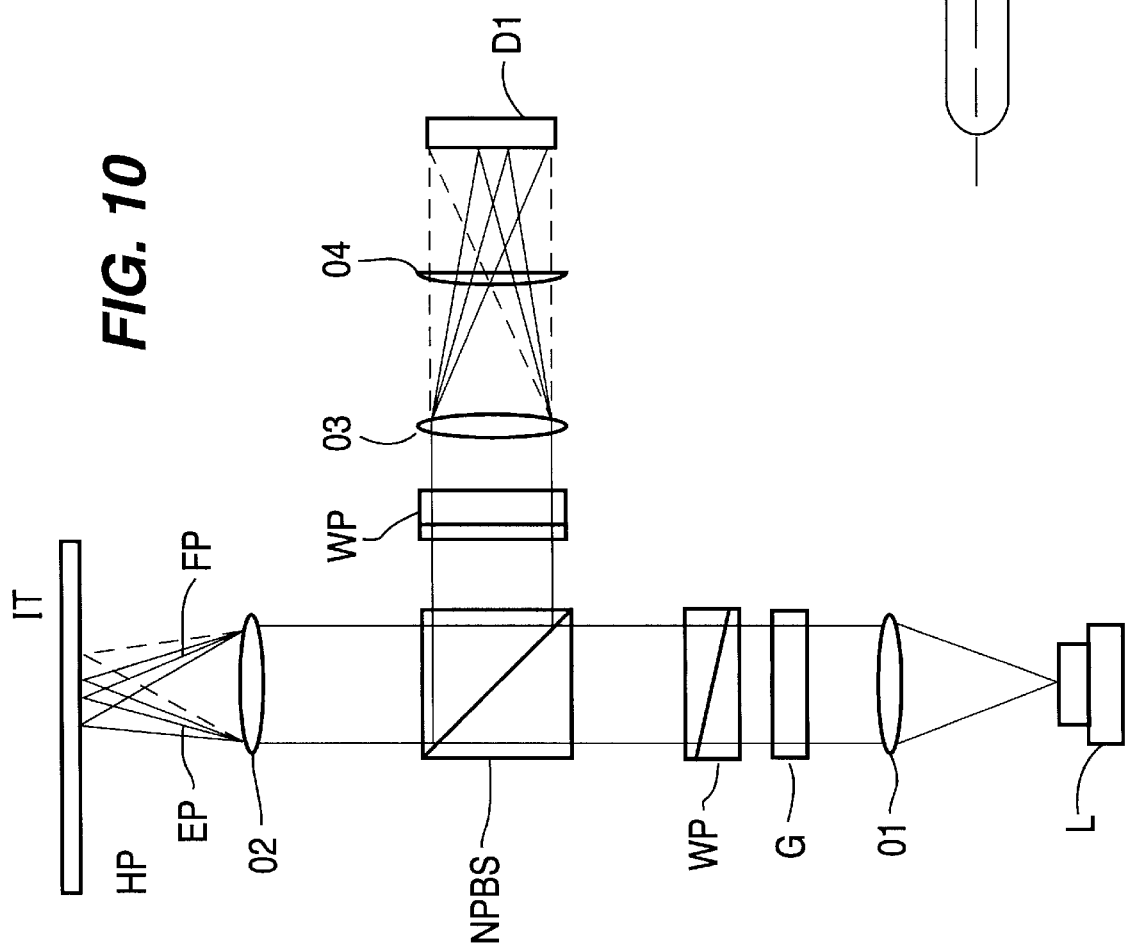
Figure 11:
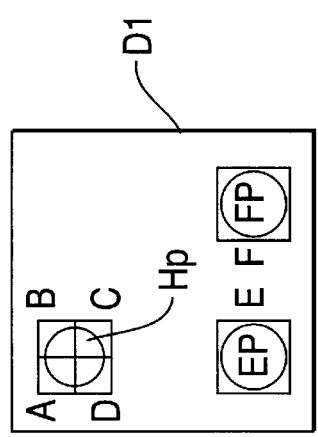
Figure 12:
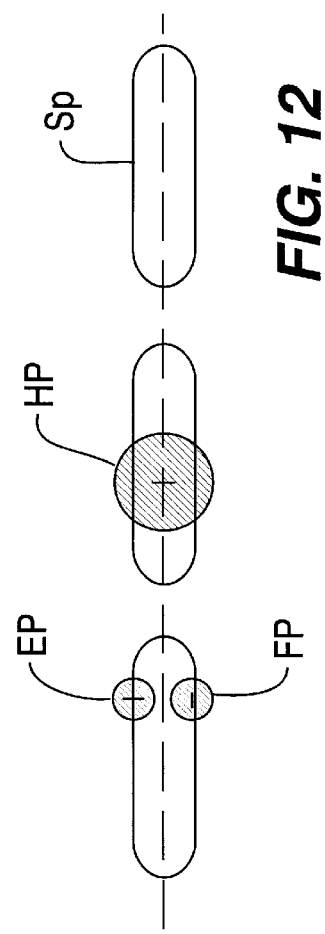

In the drawings:

FIG. 1 shows a basic sketch concerning the scanning beam positioning,

FIG. 2 shows a basic sketch concerning the scanning beam positioning according to the prior art, FIG. 3 shows a basic sketch concerning the auxiliary signal progression according to the prior art, FIG. 4 shows a basic sketch concerning the auxiliary signal progression in the case of auxiliary signal processing with delay, FIG. 5 shows a basic sketch concerning the auxiliary signal progression in the case of the elimination of scanning disturbances, FIG. 6 shows a basic sketch of an arrangement for the elimination of scanning disturbances, FIG. 7 shows a basic sketch of a two-part tangential mirror which is controllable in non-contact fashion, FIG. 8 shows auxiliary beam deflection of a two-part tangential mirror with manual angle adjustment, FIG. 9 shows a basic sketch concerning scanning beam generation using a birefringent crystal, FIG. 10 shows a basic sketch of an arrangement for scanning beam generation, FIG. 11 shows a basic sketch of a detector arrangement and FIG. 12 shows a basic sketch concerning the scanning beam arrangement using a birefringent crystal.

In accordance with FIG. 1, two auxiliary beams and respectively auxiliary light spots E, F, which are disposed side by side on the track radius on the track Sp of an information carrier IT, and a main light spot H are provided for the tracking and for the elimination of scanning disturbance. In this embodiment, the auxiliary beams E, F are disposed behind the main light spot H in the case of a track running from left to right; a positioning ahead of the main light spot H being also possible in principle. In in [sic] the figures, the auxiliary light spots E, F have been shown in differing size, for reasons of better distinction from the main light spot H, although the light spots are, as a rule, of equal size. As a result of the influencing of a laser beam in such a manner that the auxiliary beams E, F impinge side by side on the track radius of the track Sp of the information carrier IT, they can be used not only in a known manner for tracking, but, in a particularly advantageous fashion, for the elimination of scanning disturbances. The elimination of the disturbances takes place by difference formation of detected auxiliary beam signals which proceed from auxiliary beams E, F which are disposed side by side. Since the auxiliary beams E, F are disposed side by side, disturbances of both auxiliary beams E, F are, so to speak, detected simultaneously, so that disturbances are completely masked out or eliminated by the difference formation of the detected auxiliary beam signals. Herein reside the particular advantages of the process and of the arrangement as compared with the known three-beam principle, in which the auxiliary beams E, F are provided, in a manner corresponding to FIG. 2, displaced in a tangential direction ahead of and behind the main light spot H in relation to the track Sp. Auxiliary beam signals detected by means of the auxiliary beams E, F using the known auxiliary beam arrangement and in the event of the presence of an illustrative disturbance are shown in FIG. 3. It can be recognized that disturbances are detected in a manner offset by a time duration T, which is dependent upon the scanning speed and the spacing of the auxiliary beams E, F. In the case of difference formation of the auxiliary beam signals proceeding from the auxiliary beams E, F, the disturbance signal proceeding from the disturbance continues to be preserved in the track error signal. For the elimination of scanning disturbances, it has accordingly already been proposed to delay the auxiliary beam signal of the leading auxiliary beam E, ahead of the difference formation, by the time duration T. The time-offset auxiliary beam signal E' of the auxiliary beam E can then be used for the elimination of disturbances by difference formation. As a consequence of signal deformations due to the time delay, this is however successful only in part, as the third diagram in FIG. 4 illustrates. Only the positioning of the auxiliary beams E, F side by side leads to a complete extinction or to the elimination of the disturbances, as is clearly illustrated in FIG. 5. With appropriately selected polarity of the detecting means, a disturbance detected by means of auxiliary beams E, F disposed side by side leads to mirror-image auxiliary beam signals, the addition of which effects a complete extinction or elimination of the disturbance. As already mentioned, to achieve this effect a laser beam is influenced in such a manner that it generates by means of a beam deflection means STUM two auxiliary beams E, F disposed side by side on a track Sp of the information carrier, and a main light spot H. According to a first embodiment, which is shown in FIG. 6, the beam deflection means STUM can be formed by a two-part tangential mirror, which is disposed in the beam path of a scanning device operating in accordance with the three-beam principle. In order to align the auxiliary light spots E, F, according to the invention, side by side on the track Sp of an information carrier IT, and to detect auxiliary signals proceeding from the auxiliary light spots E, F, the light beam proceeding from a laser L is split by means of a grating G into 0-order and +/− 1st order beams, and aligned through a first objective lens 01 onto a steel [sic] splitter STL, which deflects the split light beam onto the two-part tangential mirror used as beam deflecting means STUM. By means of the two-part tangential mirror, the focal points or respectively the auxiliary light spots E, F and the main light spot H are then aligned via a radial mirror RS and through a second objective lens 02, on the information carrier ID in the specified manner. In this case, a partial mirror of the two-part tangential mirror is in particular used for the purpose of aligning one of the auxiliary light spots E, F alongside the other one of the auxiliary light spots E, F on the track Sp of the information carrier IT. The light reflected by the information carrier IT is then again passed through the second objective lens 02 via the radial mirror RS, the tangential mirror used as beam deflection means STUM and through the beam splitter STL and a third objective lens 03, to a detector D, which, for the detection of auxiliary beam signals and main beam signals, comprises individual photocells. However, on the return path from the information carrier IT to the detector D, the two auxiliary light spots lying side by side can no longer be separated by the tangential mirror. Accordingly, a modified Wollaston prism is to be used as grating G, by which modified Wollaston prism a circularly polarized main beam and two auxiliary beams polarized perpendicular to one another are formed from one laser beam. This polarization then permits the spatial separation of the auxiliary light spots on the return path. According to FIG. 7, the two-part tangential mirror comprises a first partial mirror TS1 and a second partial mirror TS2; in this case, a first and a second piezoelement PE1, FE2, are provided for the alignment of the partial mirrors TS1, TS2, in order to be able to control them independently of one another. According to FIG. 8, the partial mirrors TS1, TS2 can also be disposed in each instance to be pivotable about an axis ATS1 or respectively ATS2, in a frame R; in this case, a partial mirror TS1 is then adjusted mechanically relative to the other partial mirror TS2 by means of a screw SR and a retaining spring FD and the frame R is aligned with a piezoelement PE for common dynamic tangential readjustment. According to an embodiment not shown, it is also possible to use, for the beam deflection, beam-deflecting diffraction gratings which are disposed in the beam path or are integrated in at least one deflecting mirror.

However, an embodiment according to FIG. 10 proves to be particularly advantageous, in which embodiment a birefringent crystal such as for example a Wollaston prism WP is used in the beam path. The principle for the generation on the track Sp of auxiliary light spots E and F or EP and FP respectively which are disposed directly side by side is explained with reference to FIG. 9. The starting point of the scanning beam generation is formed by a laser beam which, for illustration, is to have its origin at the center of a coordinate system xy and exhibits a direction of polarization P.

This laser beam then impinges on a grating G, which is rotated through an angle °α relative to the coordinate axis y. By means of the grating G, a 0 order main beam and 2 +/− 1st order auxiliary beams are generated in a known manner. These beams are then passed through a birefringent crystal, which is preferably a Wollaston prism WP, and, on the path through the Wollaston prism WP, are both doubled with respect to their number and also influenced with respect to their direction of polarization P. Two beams generated from one by means of the Wollaston prism WP exhibit, in this case, mutually perpendicular directions of polarization P. Furthermore, two auxiliary light spots EP, FP disposed side by side on a track Sp are generated by the Wollaston prism WP. These auxiliary light spots EP, FP are derived from auxiliary beams E, F and exhibit relative to one another a perpendicular polarization P. Two main spots are also formed from the main beam H by means of the Wollaston prism WP, of which main spots, however, only one main light spot HP is used in connection with the information scanning. The behavior is similar with the further auxiliary light spots, which are indicated only for reasons of completeness. The auxiliary beams EP, FP polarized perpendicular to one another can be disposed along the track Sp at an arbitrarily small spacing from one another, on different sides of the track Sp. For the spatial separation of the auxiliary beams EP, FP, use is made of the differing directions of polarization P. A birefringent crystal is preferably used for the polarization-sensitive separation of the auxiliary beams EP, FP as well as for the detection of the information signal; the same effect can however also be achieved by means of polarization-sensitive dielectric layers. The principle, explained with reference to FIG. 9, of the formation of two auxiliary light spots EP, FP, which are disposed side by side on the radius of a track Sp of an information carrier IT is realized using an arrangement shown in FIG. 10. As shown in FIG. 10, the light of a laser L is passed via an objective lens 01, a grating G, a Wollaston prism WP, a beam splitter NPBS and an objective lens 02, to an information carrier IT, in order to form there in particular a main light spot HP for information scanning and two auxiliary light spots EP, FP disposed side by side. The light reflected by the information carrier is then passed via objective lens 02, the beam splitter NPBS, a further Wollaston prism WP, an objective lens 03 and a cylindrical lens 04, a photo detector D1 [sic]. While the Wollaston prism WP in the beam path between the laser diode L and the information carrier IT is used in particular for the purpose of arranging the auxiliary light spots EP, FP side by side, the Wollaston prism WP in the beam path between the beam splitter NPBS and the photo detector D1 is provided for the purpose of undertaking spatial separation of the polarized light. The beam splitter NPBS is a non-polarized beam splitter with a splitting ratio of 50% to 50% and the Wollaston prism WP in the beam path between the laser diode L and the information carrier IT serves as beam deflection means STU. The auxiliary light spots EP, FP formed on the information carrier IT and the main Light spot HP, which are shown in FIG. 12, are detected by the photo detector P1. The photo detector D1 includes a four-quadrant detector ABCD for the detection of the main light spot HP as well as two further detection surfaces for the detection of the auxiliary light spots EP, FP or E and F respectively, as indicated in FIG. 11. The signals detected by the photo detector D1 from the auxiliary light spots EP, FF can then be subjected directly to a difference formation for the formation of a track error signal, whereby the already mentioned advantages in tracking and masking out the disturbance signal are achieved. The polarization of the main light spot HP is of subordinate importance and can be chosen in the direction of the track Sp or perpendicular to the track Sp, in dependence upon the beam selected for information scanning. However, the direction of polarization perpendicular to the track Sp, which direction of polarization is indicated in FIG. 12, is advantageous.

We claim:

1. Method of scanning an optical information carrier having a scanning device which operates in accordance with the three-beam principle and which includes a beam splitting grating, lenses, beam deflection means and means for the difference formation of auxiliary light spot signals, said method comprising the steps of:

using the beam deflection means for providing auxiliary beams on the radius of a track of the information carrier, the auxiliary beams impinging in a side by side grouping on the track, the grouping being positioned ahead of a main light spot, forming a tracking error signal by difference formation to overcome disturbances in tracking, and eliminating disturbances by difference formation of auxiliary light spot signals produced by detectors reflecting the auxiliary beams.

2. Arrangement for carrying out the process according to claim 1 comprising:

beam deflection means disposed in the beam path of a scanning device operating in accordance with the three-beam principle, for generating on the radius of the track of the information carrier auxiliary beams forming a side by side grouping, the side by side grouping impinging the information carrier in a position one of ahead of and behind the main light spot;

means for deflecting auxiliary light spot signals formed from the reflected auxiliary beams; and means for obtaining the difference formation of the auxiliary light spot signals to overcome disturbances.

3. Arrangement according to claim 2, wherein the beam deflection means is a divided tangential mirror.

4. Arrangement according to claim 2, wherein the beam deflection means is a beam-deflecting diffraction grating.

5. Arrangement according to claim 2, wherein the beam deflection means is a birefringent crystal.

6. Arrangement according to claim 5, wherein the beam deflection means is a Wollaston prism.

7. Arrangement according to claim 2, wherein the beam deflection means is a polarization-sensitive dielectric layer.

* * * * *